(12) United States Patent
Ishida (10) Patent No.: US 11,079,090 B1
(45) Date of Patent: Aug. 3, 2021

(54) COOLING SYSTEMS FOR VEHICLE HEADLIGHTS

(71) Applicant: Morimoto Lighting, LLC, Atlanta, GA (US)

(72) Inventor: Yoshitaka Ishida, Hesperia, CA (US)

(73) Assignee: Morimoto Lighting, LLC, Atlanta, GA (US)

( * ) Notice: Subject to any disclaimer, the term of this patent is extended or adjusted under 35 U.S.C. 154(b) by 0 days.

(21) Appl. No.: 17/099,417

(22) Filed: Nov. 16, 2020

(51) Int. Cl.
| F21S 45/43 | (2018.01) |
| B60Q 1/04 | (2006.01) |
| F21S 41/148 | (2018.01) |
| F21S 41/32 | (2018.01) |
| F21W 102/13 | (2018.01) |
| F21Y 115/10 | (2016.01) |

(52) U.S. Cl.
CPC ............... *F21S 45/43* (2018.01); *B60Q 1/04* (2013.01); *F21S 41/148* (2018.01); *F21S 41/321* (2018.01); *B60Q 2400/20* (2013.01); *F21W 2102/13* (2018.01); *F21Y 2115/10* (2016.08)

(58) Field of Classification Search
CPC ........ F21S 45/43; F21S 41/148; F21S 41/321; B60Q 1/04
USPC ........................................................ 362/516
See application file for complete search history.

(56) References Cited

U.S. PATENT DOCUMENTS

| 10,161,614 | B2 | 12/2018 | Creusen et al. |
| 10,415,787 | B2 | 9/2019 | Lessard et al. |
| 2007/0115656 | A1* | 5/2007 | Chou ............... F21V 29/773 362/228 |
| 2007/0127257 | A1* | 6/2007 | Erion .............. F21V 29/763 362/547 |
| 2007/0297183 | A1* | 12/2007 | Coushaine ........ F21V 29/74 362/373 |
| 2009/0080211 | A1* | 3/2009 | Yasuda ............ F21S 45/435 362/547 |
| 2009/0129092 | A1* | 5/2009 | Chen ............... F21V 15/01 362/294 |
| 2009/0129111 | A1* | 5/2009 | Ito ................... F21S 45/43 362/547 |
| 2009/0262550 | A1* | 10/2009 | Inoue ............... F21V 29/74 362/547 |
| 2009/0303742 | A1* | 12/2009 | Yasuda ............ F21S 45/49 362/547 |

(Continued)

FOREIGN PATENT DOCUMENTS

WO    WO 2017/220394 A1    12/2017

*Primary Examiner* — Bryon T Gyllstrom
(74) *Attorney, Agent, or Firm* — Jenkins, Wilson, Taylor & Hunt, P.A.

(57) ABSTRACT

Cooling systems for LED headlight bulbs are disclosed. In some examples, a headlight bulb assembly for a vehicle headlight includes a circuit board and a first light emitting diode (LED) on the first side of the circuit board and a second LED on the second side of the circuit board. The headlight bulb assembly includes a shell at least partially enclosing the circuit board. The shell defines a sealed interior fan housing, an air intake on the first side of the circuit board, and an air exhaust on the second side of the circuit board. A circulator fan in the sealed interior fan housing is configured to draw air into the sealed interior fan housing through the air intake. The circulator fan is configured to expel the air from the sealed interior fan housing through the air exhaust.

16 Claims, 10 Drawing Sheets

(56) References Cited

U.S. PATENT DOCUMENTS

| | | | |
|---|---|---|---|
| 2010/0020563 A1* | 1/2010 | Ito | F21S 45/60 |
| | | | 362/547 |
| 2010/0103691 A1* | 4/2010 | Yasuda | F21S 45/435 |
| | | | 362/547 |
| 2010/0315830 A1* | 12/2010 | Wan | F21S 45/33 |
| | | | 362/547 |
| 2014/0328079 A1* | 11/2014 | Itagaki | F21V 29/60 |
| | | | 362/547 |
| 2018/0299093 A1* | 10/2018 | Lai | F21S 41/192 |

* cited by examiner

COOLING SYSTEMS FOR VEHICLE HEADLIGHTS

TECHNICAL FIELD

The subject matter disclosed herein relates generally to headlight bulbs for vehicle headlights. More particularly, the subject matter disclosed herein relates to cooling systems for LED headlight bulbs.

BACKGROUND

Many conventional automotive headlights use halogen bulbs. There have been attempts to adapt light-emitting-diode (LED) systems to replace such halogen bulbs, but the differences in the technologies have presented some challenges in successfully adapting LED bulbs to replace conventional halogen bulbs. For example, whereas halogen bulbs can be characterized as cylindrical filament light sources that emit light in a substantially 360 degree pattern, LED bulbs generally have a limited illumination range due to LED elements being surface-mounted devices. As a result, even with an efficient configuration that includes two LED elements facing in substantially opposite directions, there can still be dark spots in the illumination pattern such that different angular positions of the LED elements relative to the fixture result in different lighting patterns.

SUMMARY

This specification describes cooling systems for LED headlight bulbs. In some examples, a headlight bulb assembly for a vehicle headlight includes a circuit board having first and second sides and a first light emitting diode (LED) on the first side of the circuit board and a second LED on the second side of the circuit board. The headlight bulb assembly includes a shell at least partially enclosing the circuit board. The shell defines a sealed interior fan housing, an air intake on the first side of the circuit board, and an air exhaust on the second side of the circuit board. The headlight bulb assembly includes a circulator fan in the sealed interior fan housing. The circulator fan is configured to draw air into the sealed interior fan housing through the air intake on the first side of the circuit board. The circulator fan is configured to expel the air from the sealed interior fan housing through the air exhaust on the second side of the circuit board.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

This specification describes cooling systems for LED headlight bulbs. A headlight bulb assembly includes a sealed interior fan housing for a circulator fan. The circulator fan is protected from the dusty external element. The exchanged heat from the LEDs can be used, for example, for deicing the front lens. Direct LED/circuit board to air heat exchange can be used to reduce solid thermal conduction path size, which can in turn be used to improve the optics of the headlight bulb assembly.

The high-power LEDs typically used in headlight bulbs generate heat and usually require a cooling fan to dissipate heat from the LEDs efficiently. Many conventional LED bulbs with a cooling fan design use an electrical fan at the back of the LED bulb. But the fan is exposed to air outside of the headlamp housing region. In this type of system, the fan is exposed to a dusty environment, which can contribute to deterioration of the fan. Moreover, the LED heat must first conduct through an aluminum LED bulb body to a heatsink region for heat exchange.

In the headlight bulb assemblies described in this specification, the fan is contained within a sealed bulb body. The fan is protected from the dusty environment outside the bulb body. Heat exchange occurs directly at the LED circuit board. The circuit board can function as a main heatsink fin.

Using the direct heat exchanging full internal circulation cooling design, the bulb assembly dose not need to rely on thermal conductivity of the aluminum LED bulb front body for dissipating heat. Heat exchange can occur primarily directly at the LED chip. With less dependence on solid thermal conductivity, the bulb assembly can achieve LED light emitting surface intervals thinner than those of conventional bulbs.

For example, for single filament models with HKL531.TE emitters, it is as thin as 2.0 mm. In another example, for dual filament models with Z ES emitters, it is as thin as 2.4 mm. This thinness allows, for example, an H4 compliant bulb to include a shade cup under the LEDs to achieve full range unique illumination character from current template LED bulb design configuration.

Conventional halogen bulb lamp housings can come in two formats: a full sealed housing type or a gasketed bulb sealing type. In the full sealed housing type, the headlamp housing is equipped with a dust cover lid or cap behind the bulb, and the bulb is contained completely inside of the head lamp housing. In the gasketed bulb sealing type, a seal is created between an interior region and an exterior region by acting as plug. The back of the bulb is exposed to the external region.

Unlike some conventional bulb designs, the headlamp bulb assemblies described in this specification can be used in both types. In particular, the headlamp bulb assemblies described in this specification can be used in the gasketed bulb sealing type lamp housing because the bulb assembly includes a sealed interior fan housing for the circulator fan, protecting the circulator fan and the interior space of the bulb from the dusty environment.

Figure 1A:
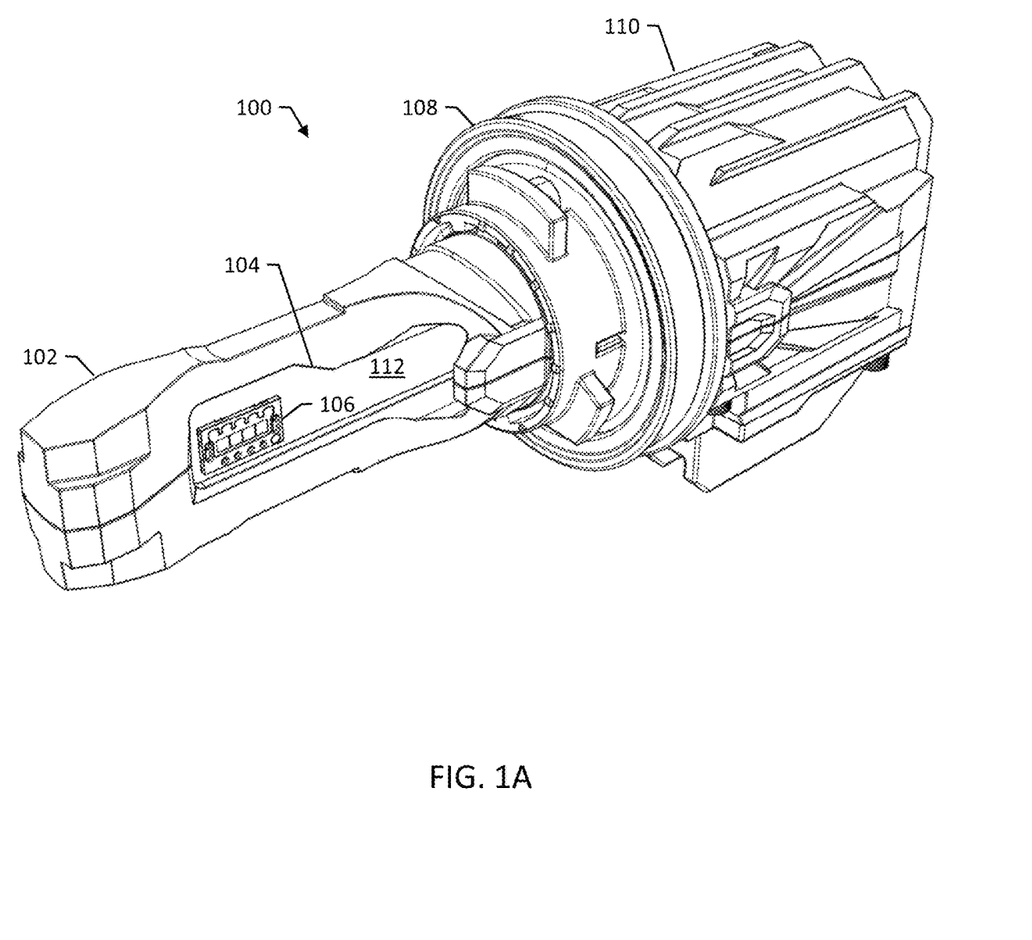
FIG. 1A is a perspective view of an example headlight bulb assembly.

FIG. 1A is a perspective view of an example headlight bulb assembly 100. The headlight bulb assembly 100 includes a circuit board 104 having left and right sides. The headlight bulb assembly 100 includes one or more LEDs 106 on one side of the circuit board 104, facing outwards, and one or more LEDS on the other side of the circuit board 104, facing outwards in an opposite direction from the LEDs on the opposite side of the circuit board 104.

Figure 1B:
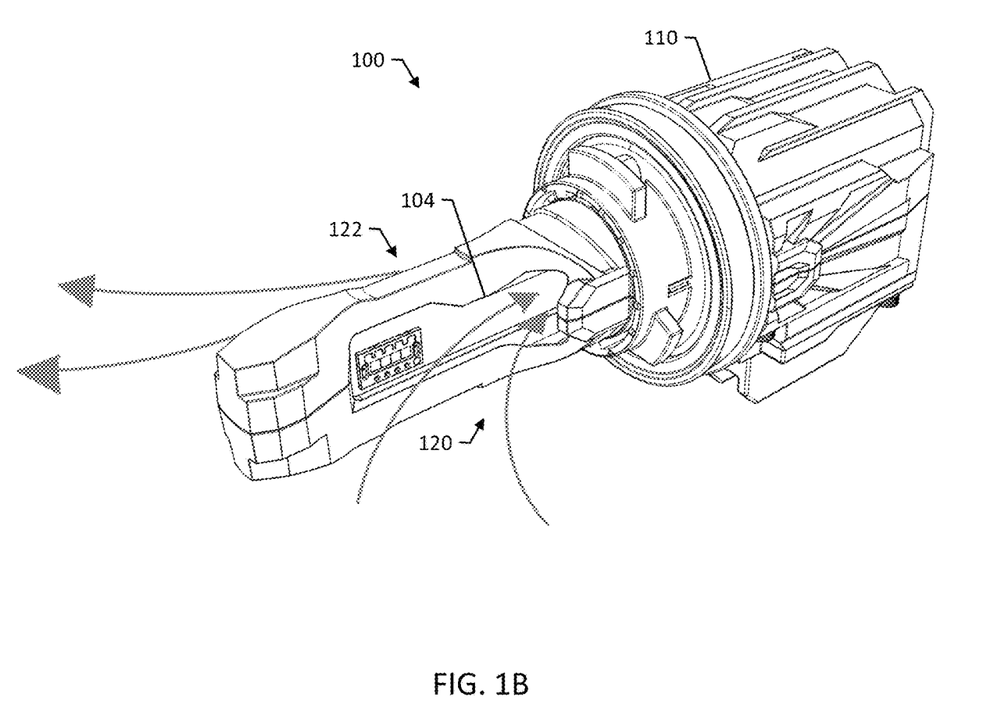
FIG. 1B illustrates the flow of air caused by a circulator fan within a sealed interior fan housing.

The headlight bulb assembly 100 includes a bulb base collar 108 and a shell 102 that at least partially encloses the circuit board 104 and the LEDs 106. The shell 102 defines a sealed interior fan housing 110. The sealed interior fan housing 110 encloses a circulator fan. The shell 102 defines apertures 112 for the LEDs 106 to face outwards FIG. 1B illustrates the flow of air caused by a circulator fan within a sealed interior fan housing. The circulator fan draws air into the sealed interior fan housing 110 through an air intake 120 on the left side of the circuit board 104. The circulator fan also expels the air from the sealed interior fan housing through an air exhaust 122 on the right side of the circuit board 104.

In the example shown in FIG. 1B, the circuit board 104 acts as an airflow divider between the air intake 120 and the air exhaust 122, and the air intake 120 and the air exhaust 122 are on opposite sides of the circuit board 104. In some other examples, the air intake 120 and the air exhaust 122 can be in different locations, for example, rotated about the circuit board 104.

Figure 2:
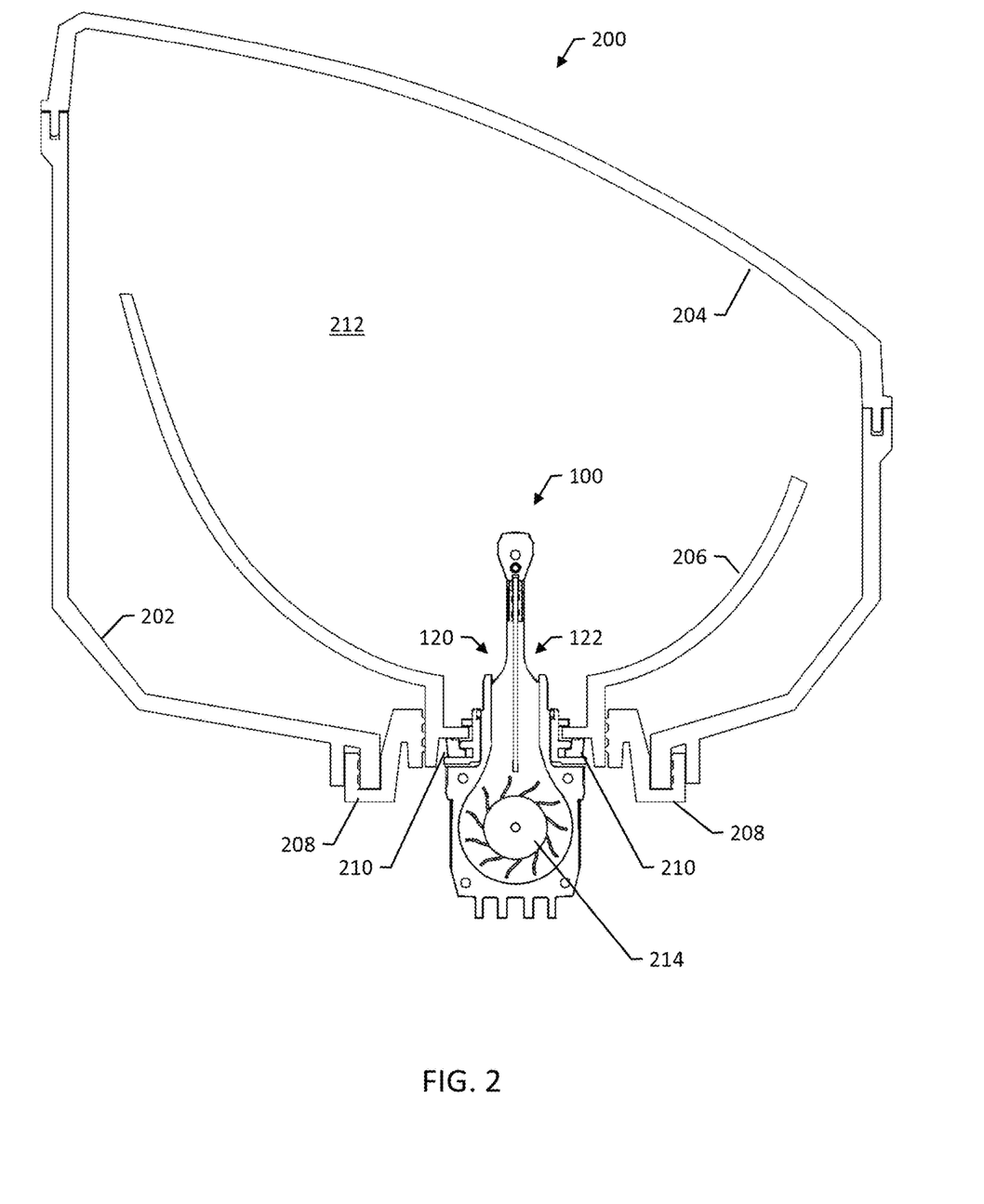
FIG. 2 is a top down view of a cross section of a headlamp including the headlight bulb assembly.

FIG. 2 is a top down view of a cross section of a headlamp 200 including the headlight bulb assembly 100. The headlamp 200 includes a housing 202 and a headlamp front cover lens 204. The headlamp 200 also includes a reflector 206 configured to reflect the light from the headlight bulb assembly 100 through the headlamp front cover lens 204 and out the front of a vehicle.

The headlight bulb assembly 100 can be secured to the headlamp 200 using one or more gaskets to create a sealed interior volume 212 inside the headlamp 200 that encloses the headlight bulb assembly 100. The sealed interior volume 212 is sealed tightly enough to avoid exchanging air outside of the headlamp 200 under normal operating conditions. In the example shown in FIG. 2, the headlight bulb assembly 100 is sealed to the headlamp 200 by a bulb-to-optic-base gasket 210 and a housing-to-optic-base gasket 208, which are part of the bulb base collar 108. The gaskets can be made from any appropriate type of compliant material.

The headlight bulb assembly 100 includes a circulator fan 214. The circulator fan 214 is configured to draw air from the sealed interior volume 212 through the air intake 120 and to expel air back into the sealed interior volume 212 through the air exhaust 122. As a result, the circulator fan 214 is not exposed to external dusty air, and directed heat exchange of the LEDs occurs through the circulating air within the sealed interior volume 212. In some examples, warm air circulating within the sealed interior volume 212 can help reduce snow or ice from building up on the lens 104.

Figure 3:
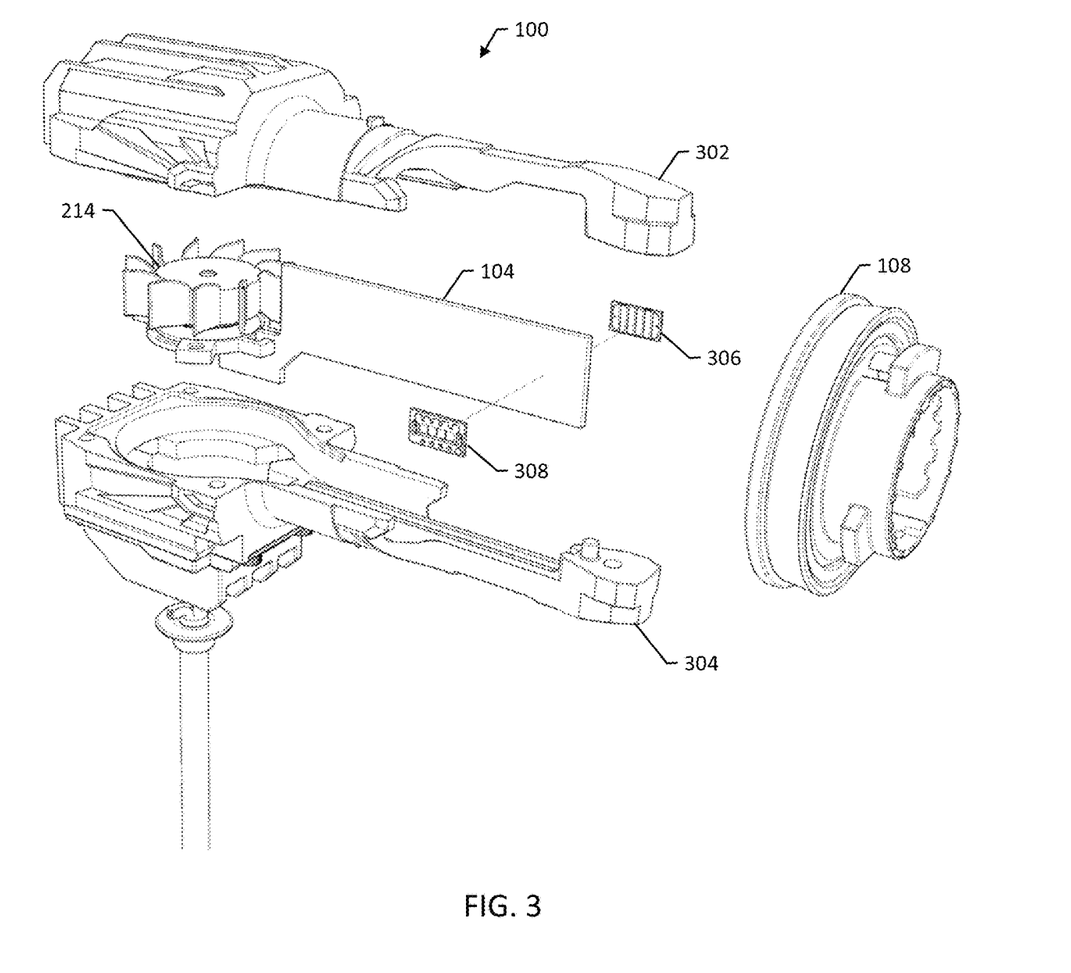
FIG. 3 is an exploded perspective view of the headlight bulb assembly.
Figure 4:
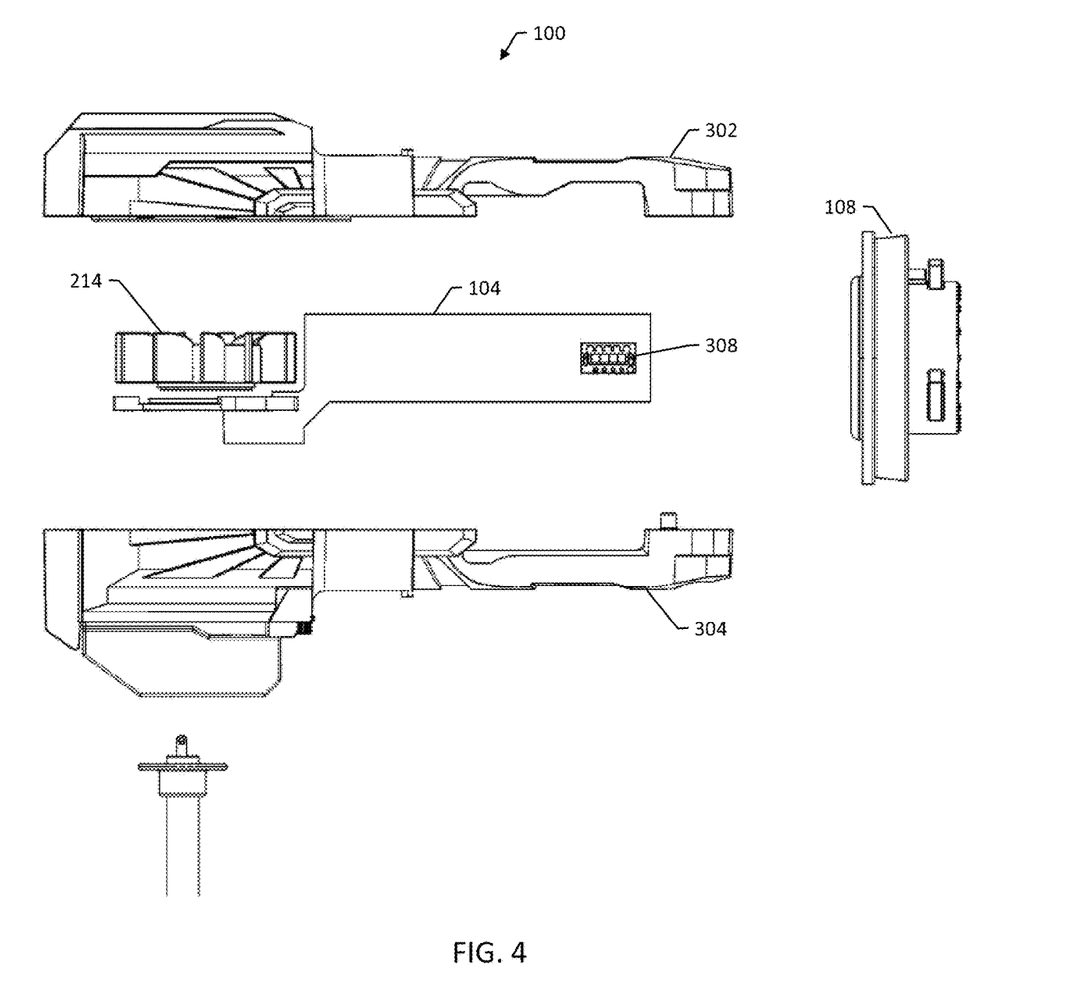
FIG. 4 is an exploded side view of the headlight bulb assembly.

FIG. 3 is an exploded perspective view of the headlight bulb assembly 100. FIG. 4 is an exploded side view of the headlight bulb assembly 100.

The headlight bulb assembly 100 can be formed from an upper shell 302 and a lower shell 304. The upper and lower shells 302 and 304 can be formed of any appropriate material, e.g., aluminum or another metal, and the upper and lower shells 302 and 304 can act as heatsinks.

FIG. 3 illustrates that the headlight bulb assembly 100 has at least one LED on each side of the circuit board 104. As shown in FIG. 3, the headlight bulb assembly 100 has at least a left LED 306 and a right LED 308.

Figure 5:
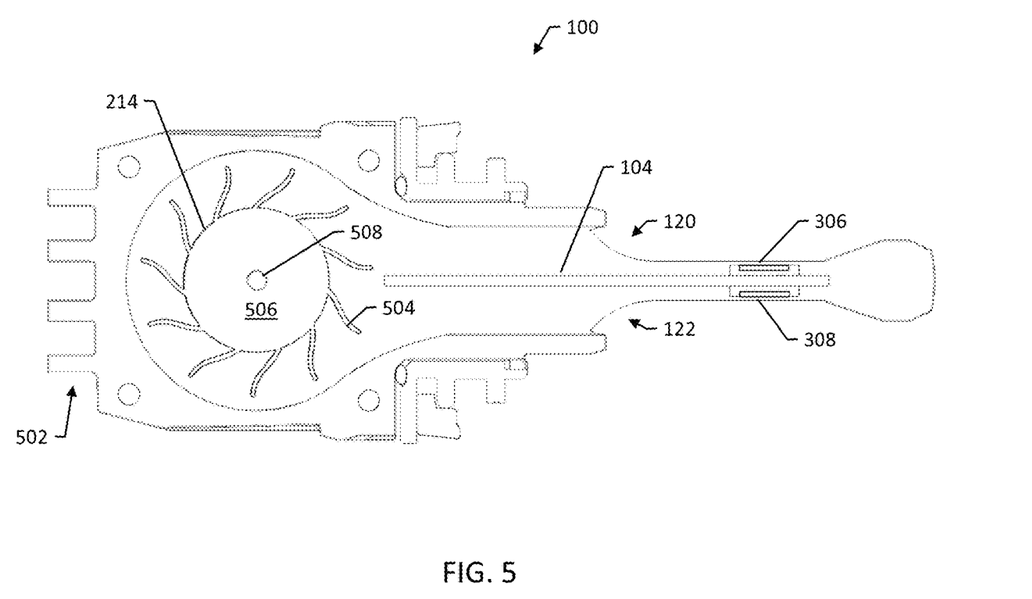
FIG. 5 is a top down view of a cross section of the headlight bulb assembly.

FIG. 5 is a top down view of a cross section of the headlight bulb assembly 100. FIG. 5 illustrates that the headlight bulb assembly 100 can include passive heatsink fins 502, e.g., surrounding the sealed interior fan housing.

As shown in FIG. 5, the circulator fan 214 includes a number of vanes 506 extending in a vertical plane (into the page) and a centrifugal fan motor 506 configured to rotate the vanes 504 about a vertical axis 508 (into the page). The circuit board 104, in addition to providing power to the LEDs 306 and 308, can act as a heatsink fin and an airflow divider.

Figure 6A:
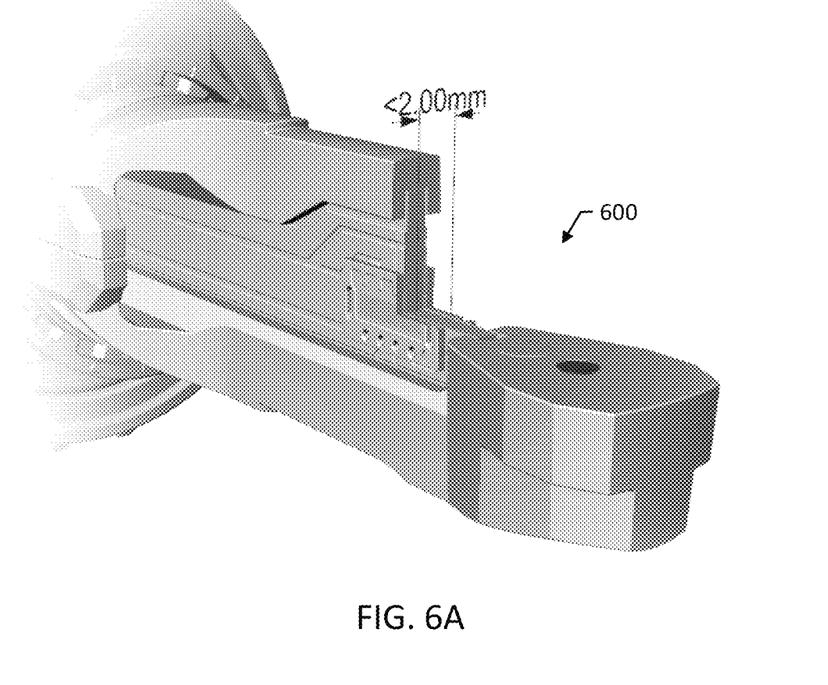
FIG. 6A illustrates an example headlight bulb assembly which is able to achieve thin LED spacing intervals by virtue of the cooling systems described in this specification.
Figure 6B:
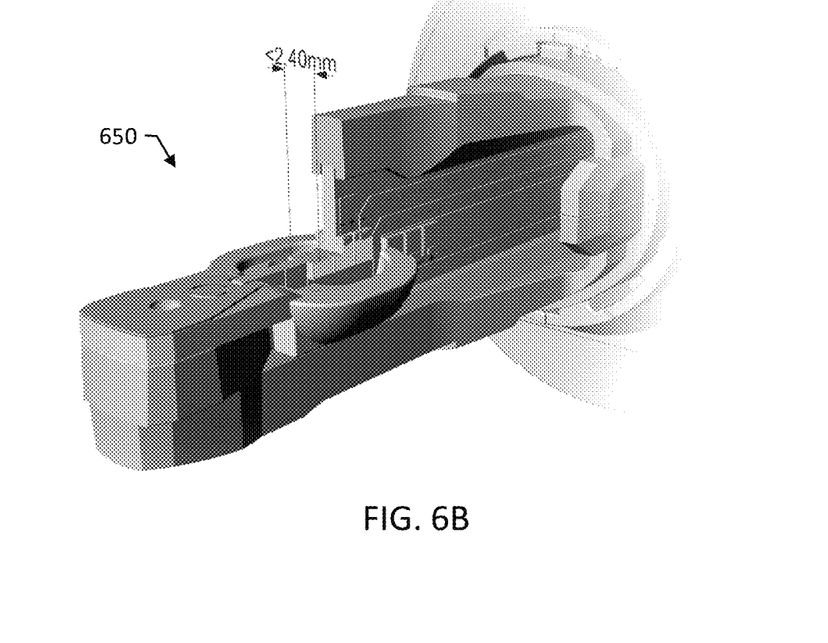
FIG. 6B illustrates another example headlight bulb assembly where the distance is reduced.

FIG. 6A illustrates an example headlight bulb assembly 600 which is able to achieve thin LED spacing intervals by virtue of the cooling systems described in this specification. Since heat exchange can occur directly at the LED, without as much reliance on solid thermal conductivity in some conventional systems, the LED spacing intervals can be reduced compared to those conventional systems. As shown in FIG. 6A, a distance between the outsides of the LEDs is reduced to 2.0 mm (for example, for single filament models with HKL531.TE emitters). FIG. 6B illustrates another example headlight bulb assembly 650 where the distance is reduced to 2.4 mm (for example, for dual filament models with Z ES emitters). This thinness allows for a shade cup to improve illumination characteristics in, for example, H4 LED bulbs, as shown below in FIGS. 7A-7C and FIG. 8.

Figure 7A:
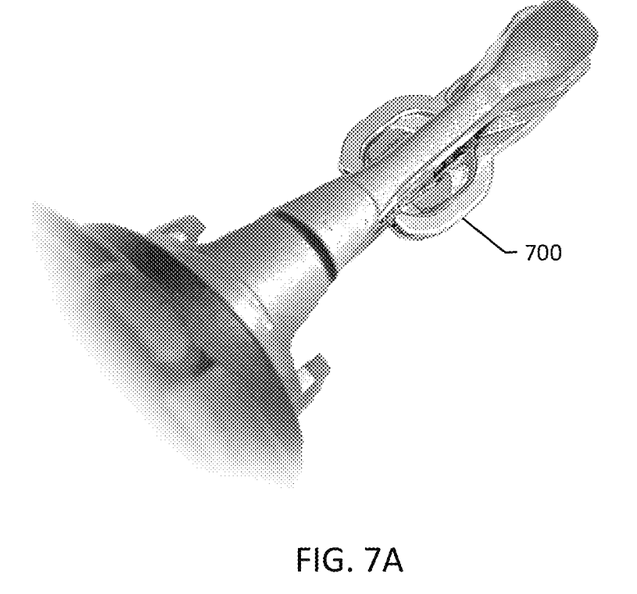
FIG. 7A shows a headlight bulb assembly including a shade cup.
Figure 7B:
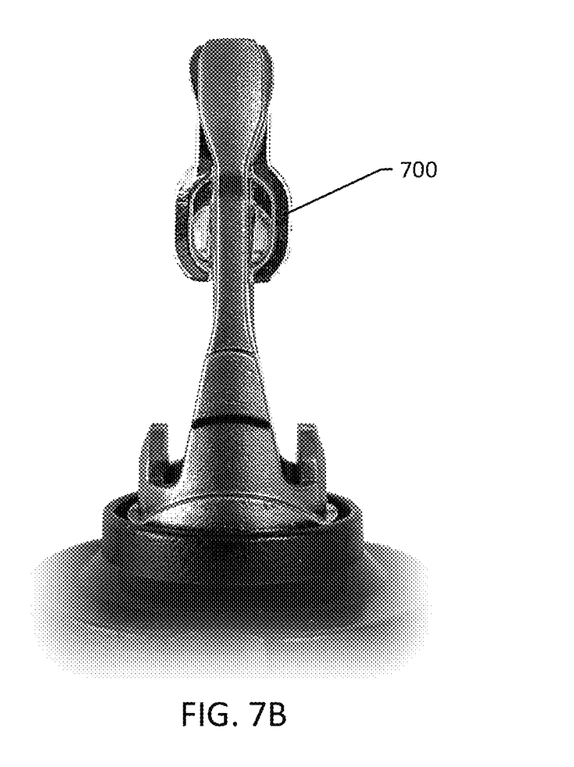
FIG. 7B shows a top down view of the shade cup.

FIG. 7A shows a headlight bulb assembly including a shade cup 700 under the circuit board and the LEDs and oriented to reflect light upwards to a reflector. FIG. 7B shows a top down view of the shade cup 700.

Figure 7C:
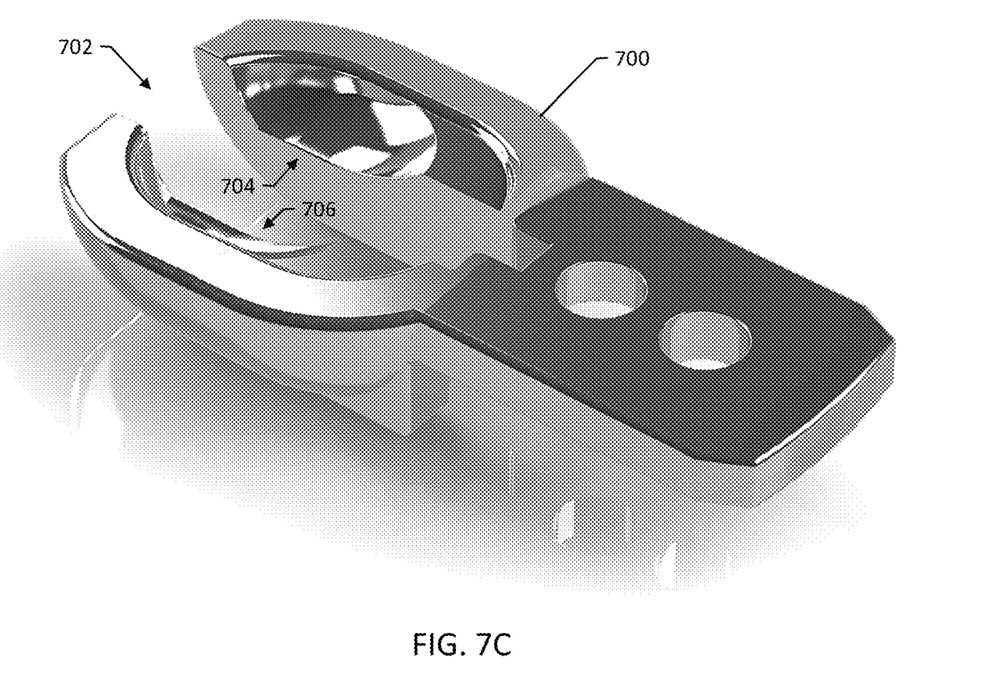
FIG. 7C shows a detailed view of the shade cup.

FIG. 7C shows a detailed view of the shade cup 700. The shade cup 700 includes left and right halves 704 and 706 of a hybrid ellipsoid reflector and a gap 702 between the left and right halves 704 and 706 for receiving the circuit board.

Figure 8:
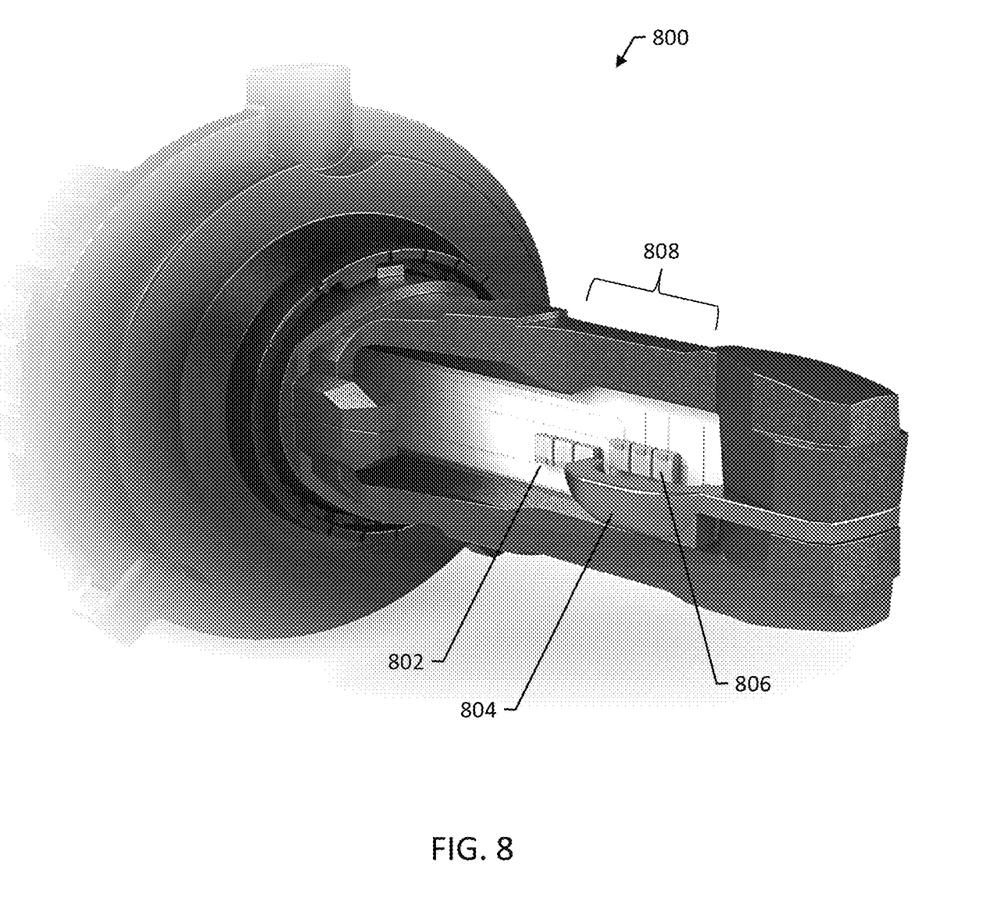
FIG. 8 shows an example headlight bulb assembly.

FIG. 8 shows an example headlight bulb assembly 800. The headlight bulb assembly 800 is an H4 bulb configured for generating high beam and low beam illumination. The headlight bulb assembly 800 includes a first set of LEDs 802 for producing the high beam illumination and a second set of LEDs 806 for producing the low beam illumination. A shade cup 804 beneath the second set of LEDs 806 directs light form the second set of LEDs 806 towards a reflector.

The portion 808 of the shell of the headlight bulb assembly 800 is thinner than in some conventional bulbs by virtue of the cooling systems described in this specification. The thinness of this portion 808 of the shell allows the shade cup 804 to direct more light from the second set of LEDs 806 into a useful viewing area out of the front of a headlight.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A headlight bulb assembly comprising:
   a circuit board comprising first and second sides;
   a first light emitting diode (LED) on the first side of the circuit board and a second LED on the second side of the circuit board;
   a shell at least partially enclosing the circuit board, wherein the shell defines a sealed interior fan housing, an air intake, and an air exhaust;
   a circulator fan in the sealed interior fan housing, wherein the circulator fan is configured to draw air into the sealed interior fan housing through the air intake, and wherein the circulator fan is configured to expel the air from the sealed interior fan housing through the air exhaust; and
   a headlight housing coupled to the headlight bulb assembly, creating a sealed interior volume inside the headlight housing that encloses the headlight bulb assembly.

2. The headlight bulb assembly of claim 1, wherein the first aperture includes the air intake and the second aperture includes the air exhaust.

3. The headlight bulb assembly of claim 1, wherein the shell comprises one or more passive heat sink fins outside of the sealed interior fan housing.

4. The headlight bulb assembly of claim 1, comprising one or more gaskets attached to the outside of the shell and oriented to couple to the headlight housing.

5. The headlight bulb assembly of claim 4, wherein the one or more gaskets comprises a bulb-to-optic-base gasket and a housing-to-optic-base gasket.

6. The headlight bulb assembly of claim 1, comprising a reflector oriented within the headlight housing to direct light from the first and second LEDs out through the headlamp front cover lens.

7. The headlight bulb assembly of claim 1, wherein an LED distance between a first outside of the first LED and a second outside of the second LED is 2.4 mm or less.

8. The headlight bulb assembly of claim 1, wherein the air intake is on the first side of the circuit board, and wherein the air exhaust is on the second side of the circuit board, and the circuit board is configured to act as an airflow divider between the air intake and the air exhaust.

9. A headlight bulb assembly comprising:
   a circuit board comprising first and second sides;
   a first light emitting diode (LED) on the first side of the circuit board and a second LED on the second side of the circuit board;
   a shell at least partially enclosing the circuit board, wherein the shell defines a sealed interior fan housing, an air intake, and an air exhaust; and
   a circulator fan in the sealed interior fan housing, wherein the circulator fan is configured to draw air into the sealed interior fan housing through the air intake, and wherein the circulator fan is configured to expel the air from the sealed interior fan housing through the air exhaust;
   wherein circulator fan comprises a plurality of vanes extending in a vertical plane and a centrifugal fan motor configured to rotate the plurality of vanes about a vertical axis.

10. A headlight bulb assembly comprising:
    a circuit board comprising first and second sides;
    a first light emitting diode (LED) on the first side of the circuit board and a second LED on the second side of the circuit board;
    a shell at least partially enclosing the circuit board, wherein the shell defines a sealed interior fan housing, an air intake, and an air exhaust; and
    a circulator fan in the sealed interior fan housing, wherein the circulator fan is configured to draw air into the sealed interior fan housing through the air intake, and wherein the circulator fan is configured to expel the air from the sealed interior fan housing through the air exhaust;
    wherein the shell defines first and second apertures in the shell and the first LED is oriented to face out through the first aperture and the second LED is oriented to face out through the second aperture.

11. A headlight bulb assembly comprising:
    a circuit board comprising first and second sides;
    a first light emitting diode (LED) on the first side of the circuit board and a second LED on the second side of the circuit board;
    a shell at least partially enclosing the circuit board, wherein the shell defines a sealed interior fan housing, an air intake, and an air exhaust;
    a circulator fan in the sealed interior fan housing, wherein the circulator fan is configured to draw air into the sealed interior fan housing through the air intake, and wherein the circulator fan is configured to expel the air from the sealed interior fan housing through the air exhaust;
    a headlight housing enclosing the shell and the first and second LEDs and the circulator fan; and
    a headlamp front cover lens coupled to the headlight housing, creating a sealed interior volume inside the headlight housing.

12. A headlight bulb assembly comprising:
    a circuit board comprising first and second sides;
    a first light emitting diode (LED) on the first side of the circuit board and a second LED on the second side of the circuit board;
    a shell at least partially enclosing the circuit board, wherein the shell defines a sealed interior fan housing, an air intake, and an air exhaust;
    a circulator fan in the sealed interior fan housing, wherein the circulator fan is configured to draw air into the sealed interior fan housing through the air intake, and wherein the circulator fan is configured to expel the air from the sealed interior fan housing through the air exhaust; and
    a shade cup under the circuit board and the first and second LEDs and oriented to reflect light upwards to a reflector.

13. The headlight bulb assembly of claim 12, wherein the shade cup comprises first and second halves of a hybrid ellipsoid reflector and a gap between the first and second halves for receiving the circuit board.

14. The headlight bulb assembly of claim 12, wherein the headlight bulb assembly is an H4 bulb configured for generating high beam and low beam illumination.

15. The headlight bulb assembly of claim 14, wherein the first and second LEDs and the shade cup are configured for producing the low beam illumination, and wherein the headlight bulb assembly comprises at least two additional LEDs configured for producing the high beam illumination.

16. A method for illuminating a headlight bulb assembly, the method comprising:
    powering, through a circuit board comprising first and second sides, a first light emitting diode (LED) on the first side of the circuit board and a second LED on the second side of the circuit board; and powering a circulator fan in a sealed interior fan housing of a shell at least partially enclosing the circuit board, wherein the shell defines a sealed interior fan housing, an air intake on the first side of the circuit board, and an air exhaust on the second side of the circuit board, and wherein powering the circulator fan comprises causing the circulator fan to draw air into the sealed interior fan housing through the air intake on the first side of the circuit board and to expel the air from the sealed interior fan housing through the air exhaust on the second side of the circuit board.

\* \* \* \* \*